United States Patent [19]

Coblenz

[11] Patent Number: 4,539,300

[45] Date of Patent: Sep. 3, 1985

[54] METHOD FOR THE FABRICATION OF HEXAGONAL BN TOUGHENED MATRIX COMPOSITES

[75] Inventor: William S. Coblenz, Fort Washington, Md.

[73] Assignee: The United States of America as represented by the Secretary of the Navy, Washington, D.C.

[21] Appl. No.: 534,478

[22] Filed: Sep. 21, 1983

[51] Int. Cl.³ .............................................. C04B 35/58
[52] U.S. Cl. ......................................... 501/98; 501/96
[58] Field of Search ..................... 501/98, 96; 423/290

[56] References Cited

U.S. PATENT DOCUMENTS 3,718,490 2/1973 Morgan et al. ...................... 423/290
4,304,870 12/1981 Rice et al. .............................. 501/98

FOREIGN PATENT DOCUMENTS 0039599 3/1977 Japan ................................... 423/290

Primary Examiner—Howard S. Williams
Attorney, Agent, or Firm—Robert F. Beers; William T. Ellis; Barry A. Edelberg

[57] ABSTRACT

BN toughened bodies having isotropic properties are produced by reacting $B_2O_3$, $H_3BO_3$ or a mixture thereof with a metal nitride or a mixture of metal nitrides. The process described may be carried out using metal tooling.

1 Claim, 2 Drawing Figures

METHOD FOR THE FABRICATION OF HEXAGONAL BN TOUGHENED MATRIX COMPOSITES

FIELD OF THE INVENTION

This invention relates to ceramic composites that are tough, yet display exceptional resistance to thermal shock. More particularly, this invention relates to a ceramic dielectric material that displays superior mechanical as well as thermal shock and ablation resistance. Such a composite may be utilized as a structural material in the fabrication of radomes and antenna windows, missile and rocket components, and other related structures which encounter high temperatures during use and are not exposed to long periods of oxidation at extreme temperatures.

BACKGROUND OF THE INVENTION

The fabrication of ceramic materials characterized by exceptional resistance to thermal shock, ablation, weather erosion, and the like has become a technology of significant importance. A number of materials have been suggested and tried in an attempt to find such a suitable material. For example, among the current conventional radome materials, alumina and "Pyroceram 9606", crystalline glass-like ceramic sold by Corning Glass, Inc., have been clearly demonstrated not to meet all these advanced requirements. Fused $SiO_2$, while having adequate resistance to thermal stress fracture, has inadequate ablation resistance due to its limited refractory character, as well as significant weather erosion deficiencies. $Si_3N_4$ has extreme thermal environment limitations, while boron nitride is extremely expensive as well as mechanically weak.

Important elements in improving a ceramic composite's thermal-stress resistance in extreme high-temperature environments are to reduce the thermal conductivity of the material and increase the strain tolerance. Introduction of a second phase material into the crystalline microstructure can significantly reduce the thermal conductivity of a ceramic material. The size and thermal conductivity of these second phase particles are extremely important composite parameters. In particular, the particle size and thermal conductivity of the second phase material determines the character of the immediate microstructure of the composite i.e. the magnitude and number of microcracks which result upon thermal expansion of both composite materials when exposed to significant temperature fluctuations. Generation of microcracks is an important strain accommodating mechanism, and hence increases strain tolerance.

The prior art has attempted to solve the problem of increased resistance to thermal shock by placing the emphasis on inhibiting or arresting crack propagation. One method of increasing the thermal resistance of a ceramic material has been the incorporation of small boron nitride particle into a matrix thereof, as described by Rice et. al. in U.S. Pat. No. 4,304,870, incorporated herein by reference. Nevertheless there have been difficulties encountered in prior art methods of incorporating BN powders into a ceramic matrix. BN powders are susceptable to oxidation. Because of their high surface area to volume ratio, small BN powders are especially susceptable to oxidation. Thus, a lower limit upon the size of BN powders which can be incorporated results. Also, due to their plate-like shape, BN particles orient during hot pressing. This orientation results in an anisotropy of properties, which may not be desirable for some uses. Further, prior art has required hot press temperatures of over 1700° C., which has resulted in difficult and expensive production. Moreover, shrinkage during sintering has made precise molding of ceramic articles difficult.

OJBECTS OF THE INVENTION

It is therefore an object of this invention to economically produce a ceramic body having small, random oriented particles of BN dispersed throughout.

It is another object of this invention to produce a BN toughened materials having isotropic properties.

It is a further object to provide a process for producing BN-toughened ceramic materials wherein metal tooling may be used during densification.

SUMMARY OF THE INVENTION

These and other objects are achieved by admixing a first reactant consisting of $B_2O_3$, $H_3BO_3$ or a mixture thereof, with a metal nitride, preferably consisting of $Si_3N_4$, AlN or a mixture thereof. The reactants are then reacted to produce a solid ceramic body having particles of BN dispersed evenly throughout.

DESCRIPTION OF THE PREFERRED EMBODIMENTS

Figure 1A:
FIGS. 1a and 1b are scanning electron micrographs (SEM's) of an article produced according to the process of this invention.

The process of this invention is dependent upon the following general reaction:

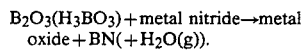

$$B_2O_3(H_3BO_3) + \text{metal nitride} \rightarrow \text{metal oxide} + BN(+H_2O(g)).$$

In this description and the claims that follow, the term "metal" includes silicon.

For example, one of the following reactions may be used to produce a BN toughened $Al_2O_3$ or $SiO_2$ matrix:

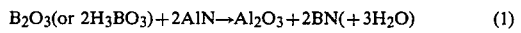

$$B_2O_3(\text{or } 2H_3BO_3) + 2AlN \rightarrow Al_2O_3 + 2BN(+3H_2O) \quad (1)$$

$$2B_2O_3(\text{or } 4H_3BO_3) + Si_3N_4 \rightarrow 3SiO_2 + 4BN(+6H_2O) \quad (2)$$

As indicated above, $H_3BO_3$ may be substituted for $B_2O_3$. $H_3BO_3$ decomposes to yield $B_2O_3$ and water. However, when $H_3BO_3$ is substituted, the water by-product must be removed.

Typically, to carry out the process of this invention, the reactants are first mixed, typically by wet-milling. The reactant mixture may then be hot-pressed typically at 450°–1200° C. At these temperatures, the use of metal molds and dies is acceptable. The reactant mixture is hot pressed at standard hot press pressures, typically 1000–5000 psi. and preferably at about 900°–1000° C. While pressures above 5000 psi may be employed, special equipment is required at pressures above this amount. After densification has occured, the temperature is set at about 1600°–1750° C., to react the reactants, thus forming BN particles and a ceramic matrix. At about 1600°–1650° C., reaction is incomplete, but the resulting product has some usefulness. At above about 1750° C., the BN particles may decompose.

The maximum volume percent BN that can be obtained by the above process is limited by the stoichiometry of the reaction employed. If more BN is desired to be incorporated, the BN particles may be added to the reaction mixture. Of course, the BN particles in the reaction mixture will orient during pressing giving some texture to the final body and might possibly serve as nucleation sites for the development of BN crystals during the reaction. Thus, some change in properties may result. If an amount of BN less than the maximum is desired, an amount of the matrix material or, in the case of mullite, reactant metal oxides to form the matrix material, may be added to the reaction mixture prior to densification. As with the addition of BN particles, the matrix material might possibly tend to act as nucleation sites, thus somewhat altering the properties of the final material. Typically, about 30 volume percent BN results in a material having excellent thermal shock characteristics. Also, mullite articles having particles of BN dispersed throughout may be produced by incorporating appropriate excess amounts of $Si_3N_4$ and/or AlN in the reaction mixture which remain as separate phases in the final body.

The reaction to form BN may be carried out either in or out of the press. In fact, if the reaction is carried out within the hot press, the hot pressing and reaction may be carried out in one step at 1600°–1750° C. However, temperatures in that range require the use of special and expensive graphite equipment. Therefore, it is recommended that the material first be densified by pressing as described above, in a temperature range where metal tooling may be used. After hot pressing, the densified reaction mixture may then be transferred to a furnace and heat-treated in a nitrogen or otherwise non-oxidizing environment at about 1600°–1750° C. to allow the reaction to occur. The use of a nitrogen atmosphere during the reaction phase is preferred to reduce decomposition of BN particles. Since BN particles react with oxides and volatile suboxides at high temperatures according to the following reactions:

$$Si_3N_4 + 3SiO_2 \rightleftharpoons 6SiO(g) + 2N_2(g) \quad (1)$$

$$2BN + 3SiO_2 \rightleftharpoons B_2O_3(l) + N_2(g) + 3SiO(g) \quad (2)$$

use of a nitrogen atmosphere reduces the tendancy of BN to decompose. If $H_3BO_3$ is used as a starting reactant, before hot pressing the reaction mixture should first be held under vacuum at over 300° C. or heated in a furnace at that temperature to remove water formed by the decomposition of $H_3BO_3$. After the moisture has been removed, the reaction mixture may be heated as described above. If the reaction mixture is to be reacted in a hot press, moisture from the decomposition of $H_3BO_3$ may be alternatively removed by providing appropriate means in the press to extract the moisture. Typically, a vacuum (about 1 mmHg) serves to remove any moisture.

An advantage to heat-treating, as opposed to hot pressing the reactants at the reaction temperature, is that with silica, alumina or mullite matrices no shrinkage occurs during heat-treating. Thus, one can form a low density radar window that is insulating in any non-oxidizing atmosphere and has a stable porosity.

BN particle size may be controlled by adjusting the temperature at which the particles are formed, or the time at which the reactants are held at that temperature. Higher reaction temperatures and longer lengths of time at which the reactants are held at that temperature yield larger particle sizes.

A highly flowable mixture of reactant powders, which is preferred in the process of this invention, may be produced by pelletizing the powders with $H_3BO_3$ as the boron source and then thermally decomposing the $H_3BO_3$ at over 300° C. to form $B_2O_3$ and water vapor. Conversely, the reactants can be wet-milled in a nonpolar liquid, for example, n-hexane, to prevent dissolution of any $H_3BO_3$ that may be present (either deliberately or by hydration of $B_2O_3$), thus forming a soft deagglomerated powder.

Because the BN particles are formed at a high temperature (about 1650° C.) after densification has been completed, the particles do not orientate. Thus, the properties (strength, elastic moduli, toughness) of the finished product are isotropic. Further, the finished material has strength, toughness and thermal shock characteristics which are as good or better than those of prior art products.

EXAMPLES

Having described the invention in general, the following examples are being given to illustrate the principles of the invention and are not intended to limit the scope of the invention in any manner.

EXAMPLE 1

(hot-pressed mullite 30 v/o BN)

53.6 g of $Si_3N_4$ (source: $AME_{85}$ IV), 158.84 g $H_3BO_3$ (boric acid) (source: Baker and Adamson), 60.60 g AlN (source: Material Research Co. N00173-M-1848), and 99.96 g $Al_2O_3$ (Linde A) were ball-milled with about 600 ml hexane for about 16 h with 890 g of $Al_2O_3$ milling media to form a slurry. The slurry was separated from the milling media and dried at about 60° C. This produced a soft, fluffy, homogeneous powder.

157 g of the above prepared powder was hot-pressed in a 3" diameter graphite die and heated slowly (about 3 h) to 800° C., under vacuum, with a 50 psi hold down pressure on the powder. The boric acid decomposed, and by 800° C. the vacuum was below 1 mm Hg. The pressure and temperature were then increased to 1600° C. and 5000 psi in about 2 h and the sample was held at this temperature and pressure for about 1 h.

The properties measured on this sample wereas follows:

1. Density = 2.59 g/cc with no open porosity.
2. X-ray diffraction analysis indicated that the major phases present were mullite and hexagonal BN with minor amount of $Al_2O_3$.
3. Fracture toughness measurements as determined by the constant moment DCB (double-cantilevered beam) method showed that $K_{IC} = 3.26$ MNt/m$^{3/2}$.
4. Thermal shock resistance as measured by the room temperature water quench test was 400° to 500° C. Three point bend strength vs. quench temperature date is displayed in Table 1.

| Quench Temp.(−°C.) | Strength (MPa) |
|---|---|
| 25 | 137.8 ± 8.3 |
| 300 | 132.7 ± 2.2 |
| 400 | 125.3 ± 18.4 |
| 500 | 88.1 ± 22.6 |
| 600 | 60.5 ± 7.8 |
| 700 | 64.2 ± 10.2 |

Figure 1B:
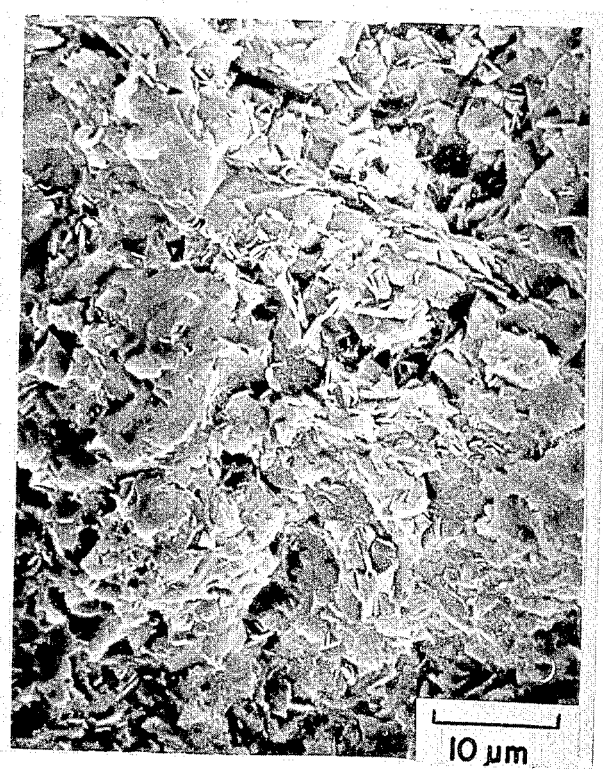

FIGS. 1a and 1b are SEMs of the product obtained in example under high and low magnification, respectively. These SEMs give some indication of the morphology, orientation and size of the BN particles produced. The BN particles have a flake structure.

EXAMPLE 2

(hot-pressed $Al_2O_3$, 46 v/o BN)

199.35 g AlN and 300.65 g $H_3BO_3$ were ball-milled with about 750 ml hexane for about 16 h with 1.1 kg $Al_2O_3$ milling media and a powder prepared as in Example 1.

187 g of this powder was hot-pressed under the same conditions as used in Example 1.

Measurements on this sample were as follows:
1. Density=2.64 g/cc with 3.9% open porosity.
2. X-ray diffraction analysis indicated that the major phases were $\alpha$-$Al_2O_3$, hexagonal BN and AlN (4H phase) with minor amounts of aluminum borate ($9Al_2O_3 \cdot 2B_2O_3$).

EXAMPLE 3

(pressureless sintered mullite, 30 v/o BN)

The same composition as was used in Example 1 was used for this example. The powder was pressed in a steel die at about 35 MPa pressing pressure. This pellet was heated in flowing nitrogen to 600° C. in order to decompose the boric acid. The pellet was removed from the furnace and weighed and its dimension measure. No shrinkage was observed. The pellet was next heated to 1600° C. in flowing nitrogen and held at that temperature for about 1 h. No shrinkage occured after this heat treatment. Weight loss between the 600° C. and 1600° C. heat treatment was about 2.5 wt %. The tensile strength as measured by the diametral compression test was 7.84 MPa. X-ray analysis indicated phases present were mullite and hexagonal BN.

EXAMPLE 4

(hot pressing of a mullite, 50 v/o BN composition where half of the BN is added directly as a BN powder)

93.9 g $Si_3N_4$, 165.5 g $H_3BO_3$ 312.2 g $Al_2O_3$, 66.4 g BN (0.4 micron) and 2.0 g $SiO_2$ (70 angstrom) were ball-milled for 16 h in 1500 ml hexane with $Al_2O_3$ milling media and a powder was prepared as in Example 1. 160 g of this powder was hot-pressed as in Example 1.

Properties measured on this sample were as follows:
1. Density=2.78 g/cc with 0.8% open porosity.
2. Fracture toughness measurements as determined by the DCB method yielded a valve for $K_{IC}$ of 2.824 $MNt/m^{3/2}$.
3. Thermal shock resistance as measured by the room temperature water quench test was about 375° C. Strength vs. quench temperature data is given in Table 2.

TABLE 2

| Quench Temp(°C.) | Strength (MPa) |
| --- | --- |
| 25 | 221.1 ± 24.5 |
| 300 | 226.0 ± 33.8 |
| 350 | 249.1 ± 24.2 |
| 375 | 119.6 ± 69.6 |
| 400 | 66.9 ± 38.4 |
| 500 | 54.1 ± 6.0 |

EXAMPLE 5

(mullite, 30 v/o BN, 27.64 v/o $Si_3N_4$)

207.6 g $Si_3N_4$, 296.4 g $H_3BO_3$ (source: MCB 5229-6-79) and 135.6 g AlN (source: Cerac Stock #1083) were ball-milled for 16 h with 1500 ml hexane and 860 g $Al_2O_3$ milling media and a powder was formed as in Example 1. 160 g of this powder was hot pressed in a 3" diameter graphite die by heating slowly (about 3 h), under to 800° C., under vacuum with a 50 psi hold down pressure. The boric acid decomposed and by 800° C. the vacuum was below 1 mm Hg. Nitrogen at 1 atm. pressure was then introduced into the chamber and flowing nitrogen was used during the remainder of the temperature pressure cycle to inhibit the reaction of metal oxides and metal nitrides at high temperatures.

The pressure and temperature were next increased to 5000 psi and 1650° C. in about 2 h and the maximum temperature and pressure maintained for one hour.

The properties measured on this sample were as follows:
1. Density=2.634 g/cc with an open porosity of 0.1%.
2. X-ray diffraction analysis indicated that the major phases present were mullite, hexagonal BN and $\beta$-$Si_3N_4$ along with several peaks which could not be indexed.
3. Fracture toughness measurements as determined by the DCB method yielded a value for $K_{IC}$ of 2.875 $MNt/m^{3/2}$.
4. Elastic moduli were measured by the pulse echo method:
Young's Modulus, E=111 GPa
Shear Modulus, G=47.7 GPa
Poisons Ratio, $\nu$=0.1598
5. Thermal shock resistance as measured by the room temperature water quench test was about 500° C. Three point bend strength vs. quench temperature data is listed in Table 3.

TABLE 3

| Quench Temp (°C.) | Strength (MPa) |
| --- | --- |
| 25 | 157 ± 27 |
| 270 | 167 ± 17 |
| 300 | 177.5 ± 35 |
| 320 | 167 ± 32 |
| 350 | 173 ± 40 |
| 400 | 172 ± 15 |
| 425 | 177 ± 27 |
| 500 | 136 ± 83 |
| 600 | 76 ± 83 |
| 800 | 53 ± 57 |

Obviously many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A process for producing a BN-toughened mullite, the steps of which comprise:
wet-milling in a non-polar liquid a mixture consisting essentially of a first reactant chosen from group consisting of $B_2O_3$, $H_3BO_3$ and mixtures thereof and a second reactant consisting essentially of AlN and $Si_3N_4$;
densifying said reactants at about 1000°–1200° C.;
reacting said reactants in a furnace at 1650°–1700° C. in a nitrogen atmosphere to produce a mullite body having hexagonal particles of BN dispersed evenly throughout.

* * * * *